(12) United States Patent
Naniwada

(10) Patent No.: US 8,290,099 B2
(45) Date of Patent: Oct. 16, 2012

(54) PHASE NOISE LIMITING APPARATUS, PHASE NOISE LIMITING METHOD, RECEIVING APPARATUS, RECEIVING METHOD, AND PROGRAMS

(75) Inventor: Koji Naniwada, Tokyo (JP)

(73) Assignee: Sony Corporation, Tokyo (JP)

( * ) Notice: Subject to any disclaimer, the term of this patent is extended or adjusted under 35 U.S.C. 154(b) by 918 days.

(21) Appl. No.: 12/236,671

(22) Filed: Sep. 24, 2008

(65) Prior Publication Data

US 2009/0080578 A1    Mar. 26, 2009

(30) Foreign Application Priority Data

Sep. 26, 2007   (JP) ................................. P2007-248678

(51) Int. Cl.
  *H04B 14/04* (2006.01)
(52) U.S. Cl. ........................................ 375/346; 375/242
(58) Field of Classification Search ................... 375/226, 375/240.27, 240.28, 254, 278, 284, 285, 375/293, 294, 296, 362, 371, 375
See application file for complete search history.

(56) References Cited

U.S. PATENT DOCUMENTS

| 4,388,726 | A | * | 6/1983 | Dehaene | ........................ 375/283 |
| 5,511,097 | A | * | 4/1996 | Tsumura | ........................ 375/324 |
| 5,646,968 | A | * | 7/1997 | Kovacs et al. | ................. 375/375 |
| 2001/0022532 | A1 | * | 9/2001 | Dolman | ........................ 330/149 |

FOREIGN PATENT DOCUMENTS

| JP | 5 66790 | 3/1993 |
| JP | 7 202573 | 8/1995 |
| JP | 11 136301 | 5/1999 |
| JP | 2000 165275 | 6/2000 |
| JP | 2005 191743 | 7/2005 |

* cited by examiner

*Primary Examiner* — David C. Payne
*Assistant Examiner* — Wednel Cadeau
(74) *Attorney, Agent, or Firm* — Frommer Lawrence & Haug LLP; William S. Frommer

(57) ABSTRACT

Disclosed herein is a phase noise limiting apparatus including a detection section configured to detect a phase noise quantity from an input signal; a determination section configured such that furnished with a plurality of correspondence tables indicating parameters used for phase synchronization with the input signal, the determination section determines one of the parameters in keeping with the phase noise quantity detected by the detection section on the basis of one of the plurality of correspondence tables; and a phase noise limitation section configured to limit the phase noise in the input signal based on the parameter determined by the determination section.

13 Claims, 8 Drawing Sheets

PHASE NOISE LIMITING APPARATUS, PHASE NOISE LIMITING METHOD, RECEIVING APPARATUS, RECEIVING METHOD, AND PROGRAMS

CROSS REFERENCES TO RELATED APPLICATIONS

The present invention contains subject matter related to Japanese Patent Application JP 2007-248678 filed in the Japan Patent Office on Sep. 26, 2007, the entire contents of which being incorporated herein by reference.

BACKGROUND OF THE INVENTION

1. Field of the Invention

The embodiment of the present invention relates to a phase noise limiting apparatus, a phase noise limiting method, a receiving apparatus, a receiving method, and programs. More particularly, the embodiment of the present invention relates to a phase noise limiting apparatus, a phase noise limiting method, a receiving apparatus, a receiving method, and programs for suitably limiting phase noise where there exist a plurality of frequency down-converters to be used.

2. Description of the Related Art

Upon frequency conversion from radio frequency (RF) to intermediate frequency (IF) signals in ordinary RF (radio frequency) circuitry, a phase noise occurs due to frequency fluctuations from a local oscillator (LO). The phase noise is known to adversely affect the demodulation performance (i.e., error rate) of a downstream demodulator. It is therefore desirable to limit the phase noise included in the IF signal upstream of the demodulation stage.

Generally, phase noise is limited using an optimal parameter corresponding to the quantity of the phase noise detected from the IF signal. One typical technique for accomplishing such noise limitation is disclosed illustratively in Japanese Patent Laid-Open No. Hei 11-136301.

SUMMARY OF THE INVENTION

Typically, there exist a wide variety of frequency down-converters (called down-converters hereunder), and diverse quantities of phase noise need be detected depending on the down-converter type. If a plurality of down-converters are expected to be incorporated in a piece of equipment, then each of the multiple down-converters needs to be furnished with an optimum parameters for phase noise limitation in that equipment according to the above-cited technique.

The embodiment of the present invention has been made in view of the above circumstances and provides arrangements for appropriately limiting phase noise where a plurality of down-converters are expected to be utilized.

In carrying out the embodiment of the present invention and according to one embodiment thereof, there is provided a phase noise limiting apparatus including: a detection section configured to detect a phase noise quantity from an input signal; a determination section configured such that furnished with a plurality of correspondence tables indicating parameters used for phase synchronization with the input signal, the determination section determines one of the parameters in keeping with the phase noise quantity detected by the detection section on the basis of one of the plurality of correspondence tables; and a phase noise limitation section configured to limit the phase noise in the input signal based on the parameter determined by the determination section.

Preferably, the phase noise limiting apparatus of the embodiment of the present invention may further include a designation section configured to designate from among the plurality of correspondence tables the correspondence table to be used by the determination section.

Preferably, the phase noise limitation section may include: a detection section configured to detect phase errors from the input signal; an averaging section configured to average the phase errors detected by the detection section in accordance with the parameter; and a phase compensation section configured to compensate the phase errors detected by the detection section from the input signal.

According to another embodiment of the present invention, there is provided a phase noise limiting method for use with a phase noise limiting apparatus for detecting a phase noise quantity from an input signal and limiting phase noise in the input signal based on the detected phase noise quantity, as well as a program for causing a computer to execute a phase noise limiting process equivalent to the phase noise limiting method, the phase noise limiting method or process including the steps of: detecting the phase noise quantity from the input signal; furnished with a plurality of correspondence tables indicating parameters used for phase synchronization with the input signal, determining one of the parameters in keeping with the phase noise quantity detected in the detecting step on the basis of one of the plurality of correspondence tables; and limiting the phase noise in the input signal based on the parameter determined in the determining step.

According to a further embodiment of the present invention, there is provided a receiving apparatus for receiving an input signal, the receiving apparatus including: a frequency conversion section configured to convert the input signal in frequency; a detection section configured to detect a phase noise quantity from the input signal converted in frequency by the frequency conversion section; a determination section configured such that furnished with a plurality of correspondence tables indicating parameters used for phase synchronization with the input signal, the determination section determines one of the parameters in keeping with the phase noise quantity detected by the detection section on the basis of one of the plurality of correspondence tables which corresponds to the type of a frequency converter constituting the frequency conversion section; and a phase noise limitation section configured to limit the phase noise in the input signal based on the parameter determined by the determination section.

According to an even further embodiment of the present invention, there is provided a receiving method for receiving an input signal, as well as a program for causing a computer to execute a receiving process equivalent to the receiving method, the receiving method or program including the steps of: converting the input signal in frequency by use of a frequency conversion section; detecting a phase noise quantity from the input signal converted in frequency by the frequency conversion section in the converting step; furnished with a plurality of correspondence tables indicating parameters used for phase synchronization with the input signal, determining one of the parameters in keeping with the phase noise quantity detected in the detecting step on the basis of one of the plurality of correspondence tables which corresponds to the type of a frequency converter constituting the frequency conversion section; and limiting the phase noise in the input signal based on the parameter determined in the determining step.

Where the inventive phase noise limiting apparatus, phase noise limiting method, or program representative of the phase noise limiting method is in use, a phase noise quantity is first detected from the input signal. Given a plurality of correspondence tables indicating parameters used for phase synchronization with the input signal, one of the parameters is determined in keeping with the detected phase noise quantity on the basis of one of the plurality of correspondence tables. The phase noise is then limited in the input signal based on the parameter thus determined.

Where the inventive receiving apparatus, receiving method, or program representative of the receiving method is in use, the input signal is first converted in frequency by use of a frequency conversion section. A phase noise quantity is detected from the input signal converted in frequency by the frequency conversion section. Given a plurality of correspondence tables indicating parameters used for phase synchronization with the input signal, one of the parameters is determined in keeping with the detected phase noise quantity on the basis of one of the plurality of correspondence tables which corresponds to the type of a frequency converter constituting the frequency conversion section. The phase noise is then limited in the input signal based on the parameter thus determined.

Where the embodiment of the present invention is embodied as outlined illustratively above, it is possible to limit phase noise appropriately even if there are a plurality of down-converters to be used in a piece of equipment.

DETAILED DESCRIPTION OF THE PREFERRED EMBODIMENTS

What is described below as the preferred embodiments of the present invention with reference to the accompanying drawings corresponds to the appended claims as follows: the description of the preferred embodiments basically provides specific examples supporting what is claimed. If any example of the invention described below as a preferred embodiment does not have an exactly corresponding claim, this does not mean that the example in question has no relevance to the claims. Conversely, if any example of the invention depicted hereunder has a specifically corresponding claim, this does not mean that the example in question is limited to that claim or has no relevance to other claims.

One embodiment of the present invention is a phase noise limiting apparatus including: a detection section (e.g., phase noise quantity detector 41 in FIG. 2) configured to detect a phase noise quantity from an input signal; a determination section (e.g., gain determination circuit 42 in FIG. 2) configured such that furnished with a plurality of correspondence tables indicating parameters used for phase synchronization with the input signal, the determination section determines one of the parameters in keeping with the phase noise quantity detected by the detection section on the basis of one of the plurality of correspondence tables; and a phase noise limitation section (e.g., phase synchronizer circuit 43 in FIG. 2) configured to limit the phase noise in the input signal based on the parameter determined by the determination section.

Preferably, the phase noise limiting apparatus of the above embodiment may further include a designation section (e.g., control section 15 in FIG. 2) configured to designate from among the plurality of correspondence tables the correspondence table to be used by the determination section.

Figure 2:
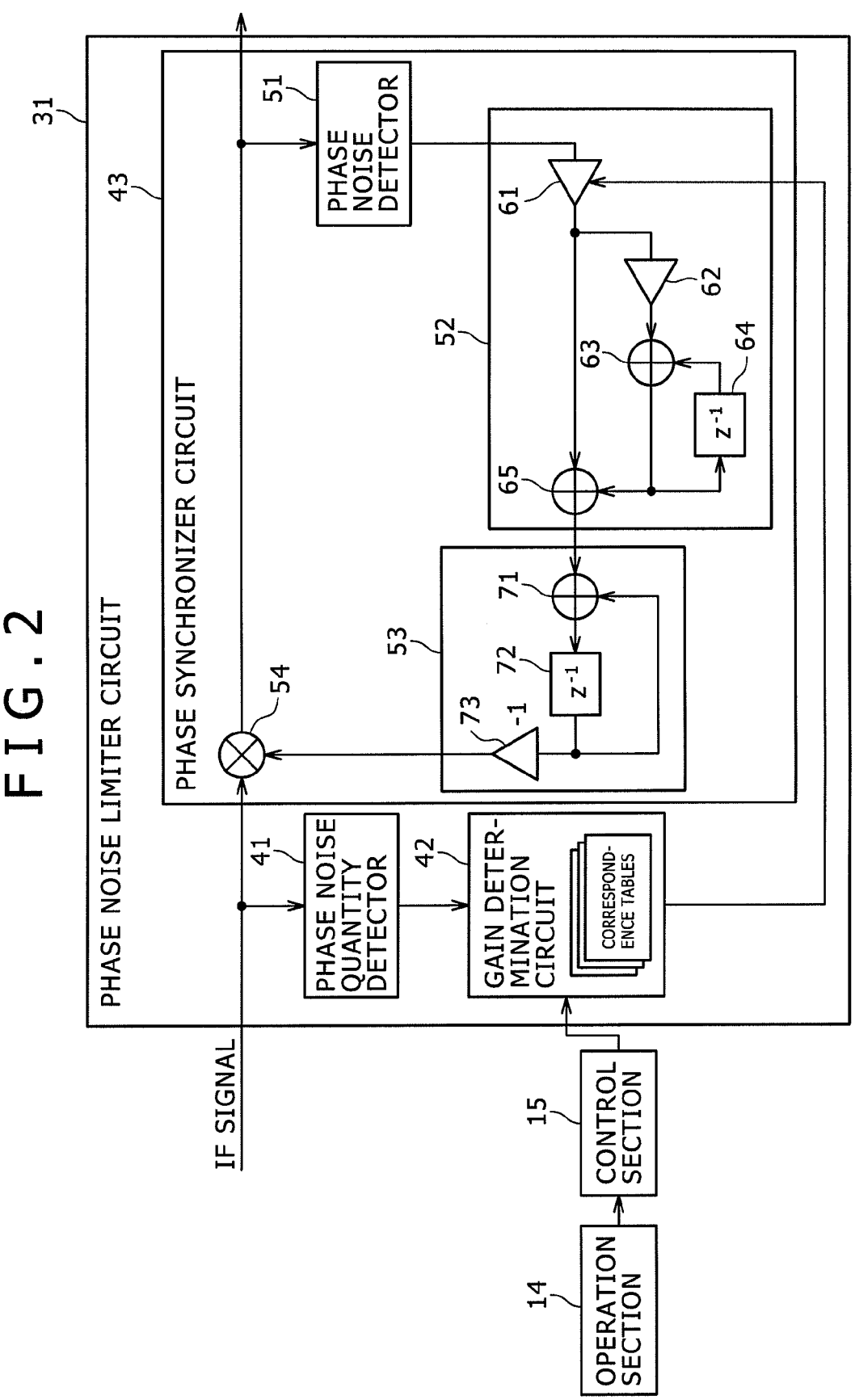
FIG. 2 is a block diagram showing a typical internal structure of a phase noise limiter circuit.

Preferably, the phase noise limitation section may include: a detection section (e.g., phase noise detector 51 in FIG. 2) configured to detect phase errors from the input signal; an averaging section (e.g., loop filter 52 in FIG. 2) configured to average the phase errors detected by the detection section in accordance with the parameter; and a phase compensation section (e.g., numerically controlled oscillator 53 and multiplier 54 in FIG. 2) configured to compensate the phase errors detected by the detection section from the input signal.

Another embodiment of the present invention is a phase noise limiting method for use with a phase noise limiting apparatus for detecting a phase noise quantity from an input signal and limiting phase noise in the input signal based on the detected phase noise quantity, as well as a program for causing a computer to execute a phase noise limiting process equivalent to the phase noise limiting method, the phase noise limiting method or process including the steps of: detecting (e.g., in step S1 of FIG. 3) the phase noise quantity from the input signal; furnished with a plurality of correspondence tables indicating parameters used for phase synchronization with the input signal, determining (e.g., in step S2 of FIG. 3) one of the parameters in keeping with the phase noise quantity detected in the detecting step on the basis of one of the plurality of correspondence tables; and limiting (e.g., in step S3 of FIG. 3) the phase noise in the input signal based on the parameter determined in the determining step.

A further embodiment of the present invention is a receiving apparatus (e.g., TV set 1 in FIG. 1) for receiving an input signal, the receiving apparatus including: a frequency conversion section (e.g., down-converter 22) configured to convert the input signal in frequency; a detection section (e.g., phase noise quantity detector 41 in FIG. 2) configured to detect a phase noise quantity from the input signal converted in frequency by the frequency conversion section; a determination section (e.g., gain determination circuit 42 in FIG. 2) configured such that furnished with a plurality of correspondence tables indicating parameters used for phase synchronization with the input signal, the determination section determines one of the parameters in keeping with the phase noise quantity detected by the detection section on the basis of one of the plurality of correspondence tables which corresponds to the type of a frequency converter constituting the frequency conversion section; and a phase noise limitation section (e.g., phase synchronizer circuit 43 in FIG. 2) configured to limit the phase noise in the input signal based on the parameter determined by the determination section.

An even further embodiment of the present invention is a receiving method for receiving an input signal, as well as a program for causing a computer to execute a receiving process equivalent to the receiving method, the receiving method or program including the steps of: converting (e.g., processing by down-converter 22 in FIG. 1) the input signal in frequency by use of a frequency conversion section; detecting (e.g., in step S1 of FIG. 3) a phase noise quantity from the input signal converted in frequency by the frequency conversion section in the converting step; furnished with a plurality of correspondence tables indicating parameters used for phase synchronization with the input signal, determining (e.g., in step S2 of FIG. 3) one of the parameters in keeping with the phase noise quantity detected in the detecting step on the basis of one of the plurality of correspondence tables which corresponds to the type of a frequency converter constituting the frequency conversion section; and limiting (e.g., in step S3 of FIG. 3) the phase noise in the input signal based on the parameter determined in the determining step.

The preferred embodiments of the present invention will now be described in reference to the accompanying drawings.

Figure 1:
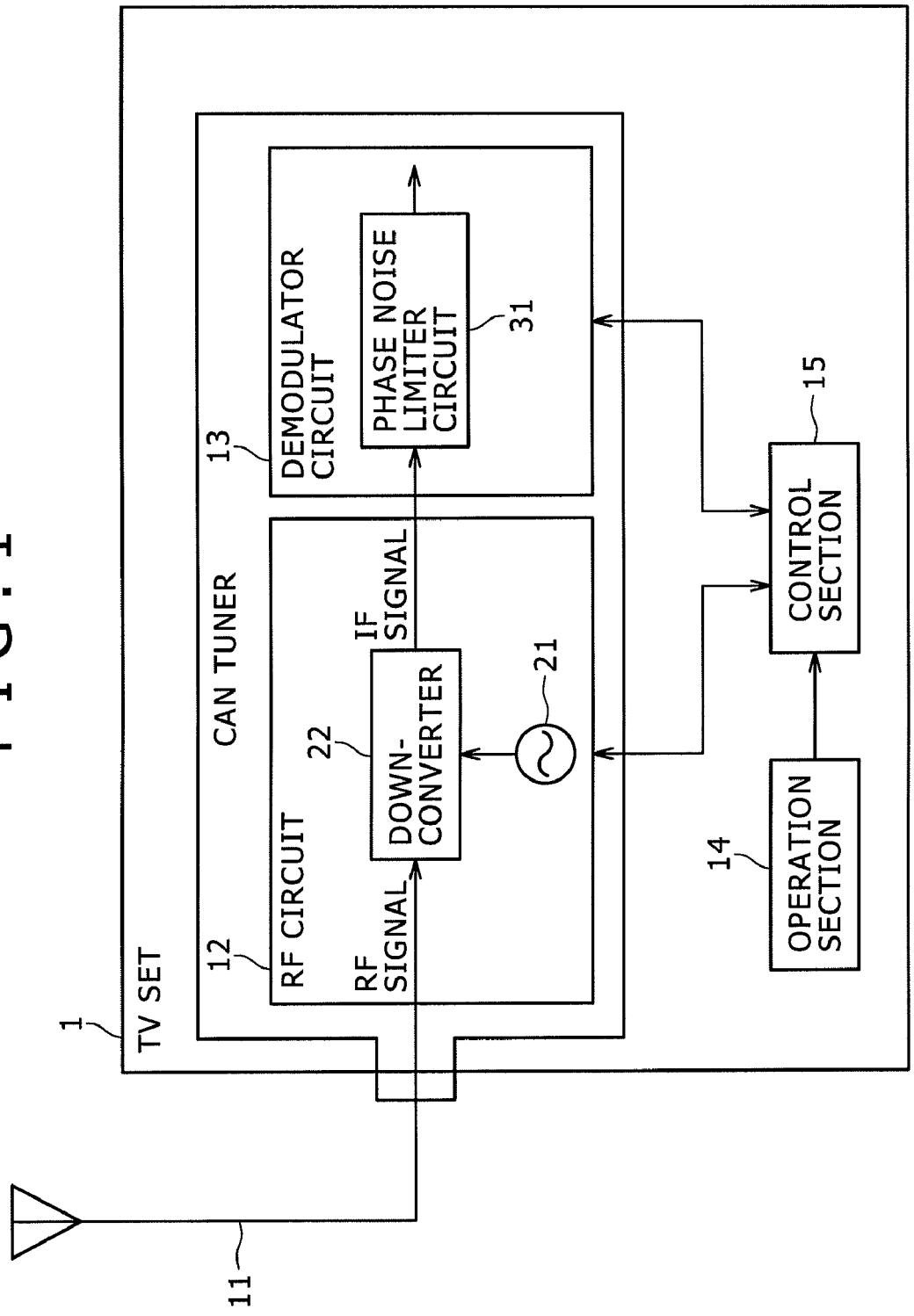
FIG. 1 is a block diagram showing a typical structure of a TV set embodying the embodiment of the present invention.

FIG. 1 is a block diagram showing a typical structure of a TV (television) set 1 embodying the embodiment of the present invention. In FIG. 1, merely those components that are relevant to the embodiment of the present invention are shown; the other circuits (e.g., image processing circuit, display control circuit, etc.) generally found in ordinary TV sets are omitted.

The TV set 1 is made up of an antenna 11, an RF circuit 12, a demodulator circuit 13, an operation section 14, and a control section 15.

The antenna 11 receives an RF signal, typically a broadcast signal transmitted digitally by a broadcasting station, not shown. The received RF signal is sent to the RF circuit 12. Under control of the control section 15, the RF circuit 12 performs such processes as amplification and frequency conversion on the RF signal coming from the antenna 11. An IF signal resulting from the processing by the RF circuit 12 is supplied to the demodulator circuit 13.

The RF circuit 12 is typically constituted by a local oscillator (LO) 21 and a down-converter 22.

The LO 21 generates a signal of a predetermined frequency and feeds the generated signal to the down-converter 22. In operation, the LO 21 concomitantly generates phase noise having a characteristic particular to the generated signal. This process determines the phase noise of the IF signal sent from the RF circuit 12 to the demodulator circuit 13.

The down-converter 22 is a frequency converter that multiplies the signal of the predetermined frequency from the LO 21 by the RF signal coming from the antenna 11. The multiplying operation creates illustratively an IF signal at 57 MHz representing the difference in frequency between the two signals multiplied. The IF signal thus generated is sent to the demodulator circuit 13.

Under control of the control section 15, the demodulator circuit 13 performs such processes as phase noise limitation, demodulation, and error correction on the IF signal fed by the RF circuit 12. Through such processing, the demodulator circuit 13 creates and outputs video and audio data. These kinds of data from the demodulator circuit 13 are subjected to further processing downstream whereby images corresponding to the video data are displayed on a display screen (not shown) and sounds corresponding to the audio data are output from speakers (not shown).

A phase noise limiter circuit 31 in the demodulator circuit 13 limits phase noise. More specifically, the phase noise limiter circuit 31 detects a phase noise quantity in the IF signal fed from the RF circuit 12, and determines a loop gain in accordance with the detected phase noise quantity. The phase noise limiter circuit 31 proceeds to perform phase synchronization based on the loop gain thus determined, thereby limiting the phase noise in the IF signal.

The RF circuit 12 and demodulator circuit 13 make up what is known as a can tuner integrating its components in a single module. A plurality of (e.g., five in this example) down-converters 22 are scheduled to be incorporated in each TV set 1. One of these down-converters is incorporated in the RF circuit 12 as the down-converter 22.

The operation section 14 is operated by an operator illustratively upon manufacture of the TV set 1. The operation section 14 supplies the control section 15 with the commands and data corresponding to the actions taken by the operator.

In turn, the control section 15 carries out appropriate processes based on the commands and data coming from the operation section 14.

Described below in reference to FIG. 2 is a typical internal structure of the phase noise limiter circuit 31.

The phase noise limiter circuit 31 is made up of a phase noise quantity detector 41, a gain determination circuit 42, and a phase synchronizer circuit 43.

The phase noise quantity detector 41 and phase synchronizer circuit 43 are supplied with the IF signal from the RF circuit 12.

The phase noise quantity detector 41 detects a phase noise quantity in the supplied IF signal and notifies the gain determination circuit 42 of the detected phase noise quantity.

The gain determination circuit 42 retains correspondence tables which apply individually to the multiple down-converters 22 scheduled to be used, each of the tables indicating an optimal loop gain for limiting the target phase noise. The correspondence tables will be discussed later in more detail.

The gain determination circuit 42 references the applicable correspondence table in determining the loop gain corresponding to the phase noise quantity reported from the phase noise quantity detector 41. The loop gain thus determined is signaled to the phase synchronizer circuit 43.

Based on the loop gain reported from the gain determination circuit 42, the phase synchronizer circuit 43 performs phase synchronization on the IF signal sent by the RF circuit 12 in order to limit phase noise in the IF signal. The IF signal free of its phase noise is output by the phase synchronizer circuit 43 and subjected to demodulation, error correction and other processing downstream.

Figure 3:
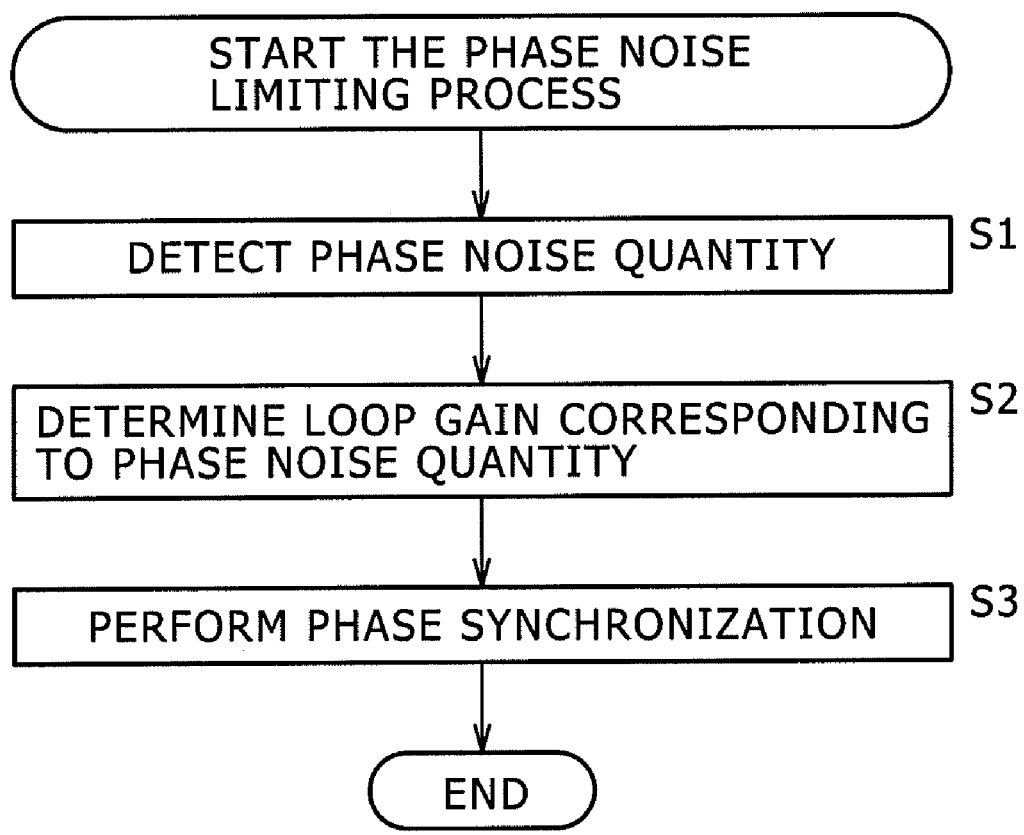
FIG. 3 is a flowchart of steps constituting a phase noise limiting process performed by the phase noise limiter circuit 31.

Described below in reference to the flowchart of FIG. 3 are the steps constituting the typical phase noise limiting process carried out by the phase noise limiter circuit 31.

It is assumed that from among the correspondence tables it retains, the gain determination circuit 42 has selectively established one for gain determination which is designated by the control section, and reflects the action of the operator operating the operation section 14 (i.e., the correspondence table deemed optimally suitable for the down-converter 22 in use is selected by the operator).

The phase noise limiting process is started when the TV set 1 is switched on.

In step S1, the phase noise quantity detector 41 detects from the supplied IF signal a phase noise quantity represented by the difference between the power level at a given high frequency (in the power spectrum) of the IF signal on the on hand and the power level at a given low frequency (in the power spectrum) on the other hand. The phase noise quantity thus detected is reported to the gain determination circuit 42.

In step S2, upon receipt of the phase noise quantity from the phase noise quantity detector 41, the gain determination circuit 42 references the established correspondence table and thereby determines the loop gain applicable to the phase noise quantity. The loop gain thus determined is reported to the phase synchronizer circuit 43.

In step S3, based on the loop gain signaled by the gain determination circuit 42, the phase synchronizer circuit 43 performs phase synchronization on the IF signal coming from the RF circuit 12. Following the phase synchronization, the phase synchronizer circuit 43 outputs the resulting IF signal (optimally freed of its phase noise).

What follows is a description of the correspondence tables kept by the gain determination circuit 42.

Figure 4:
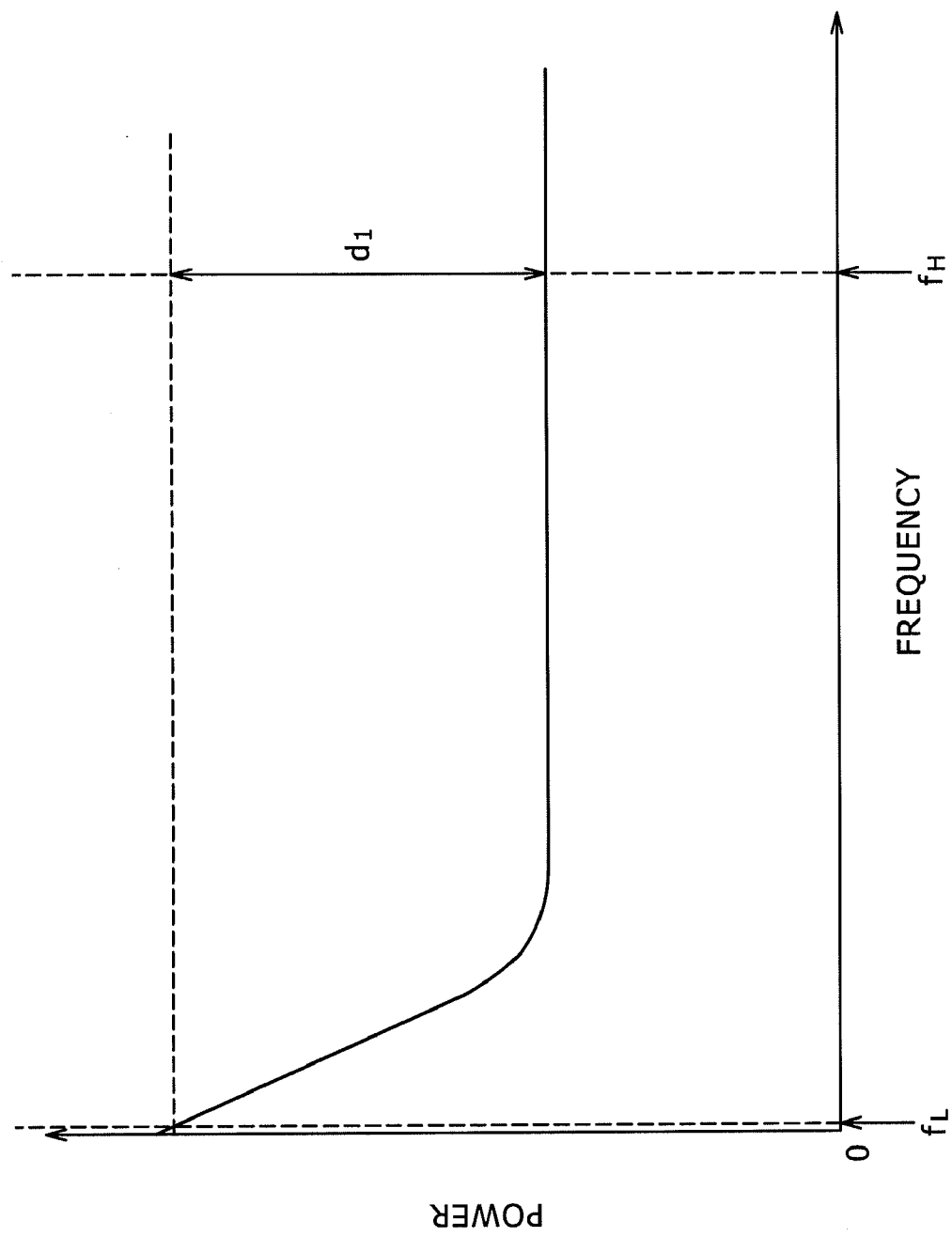
FIG. 4 is a graphic representation illustrating a typical power spectrum.

Suppose that, say, a type #1 down-converter is adopted as the down-converter 22. In this case, as shown in FIG. 4, the power level at a given high frequency $f_H$ (in the power spectrum) is relatively low compared with the power level with a 1/f noise (e.g., phase noise whose characteristic is specific to the LO 21) near a frequency $f_L$ which needs to be limited. A relatively large difference $d_1$ between the two power levels is then detected as the phase noise quantity.

Figure 5:
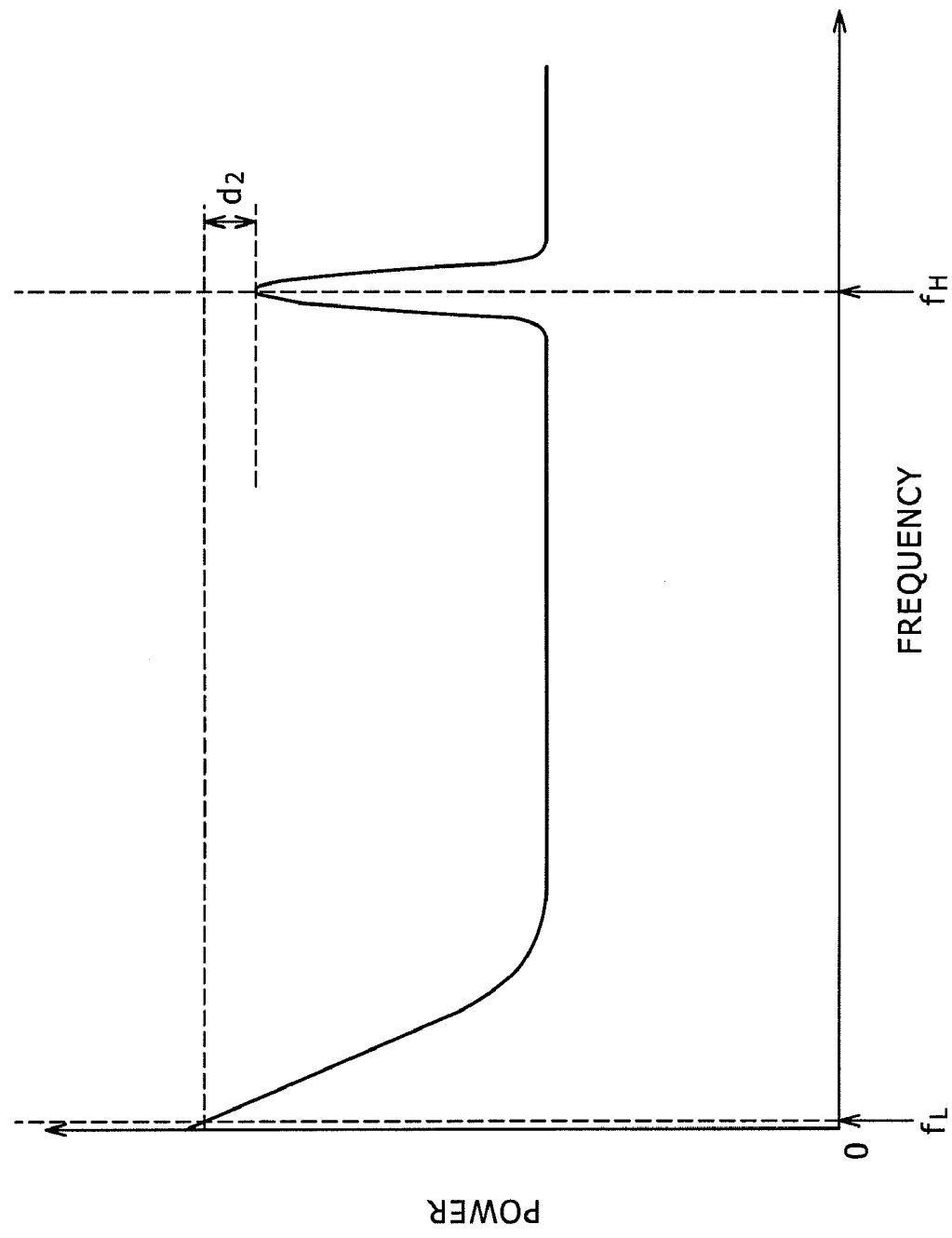
FIG. 5 is a graphic representation illustrating another typical power spectrum.

Suppose now that a type #5 down-converter is adopted as the down-converter 22. In such a case, as shown in FIG. 5, the 1/f noise near the frequency $f_L$ to be limited is about the same in quantity as that with the type #1 down-converter. However, a spurious peak near the frequency $f_H$ (in the power spectrum) raises the power level there, so that a difference $d_2$ smaller than the difference $d_1$ mentioned above is detected as the phase noise quantity.

As described, the phase noise quantity detected with regard to the phase noise to be limited varies from one down-converter type to another. For that reason, there are provided as many correspondence tables as the converter types each for use as the down-converter 22.

Figure 6:
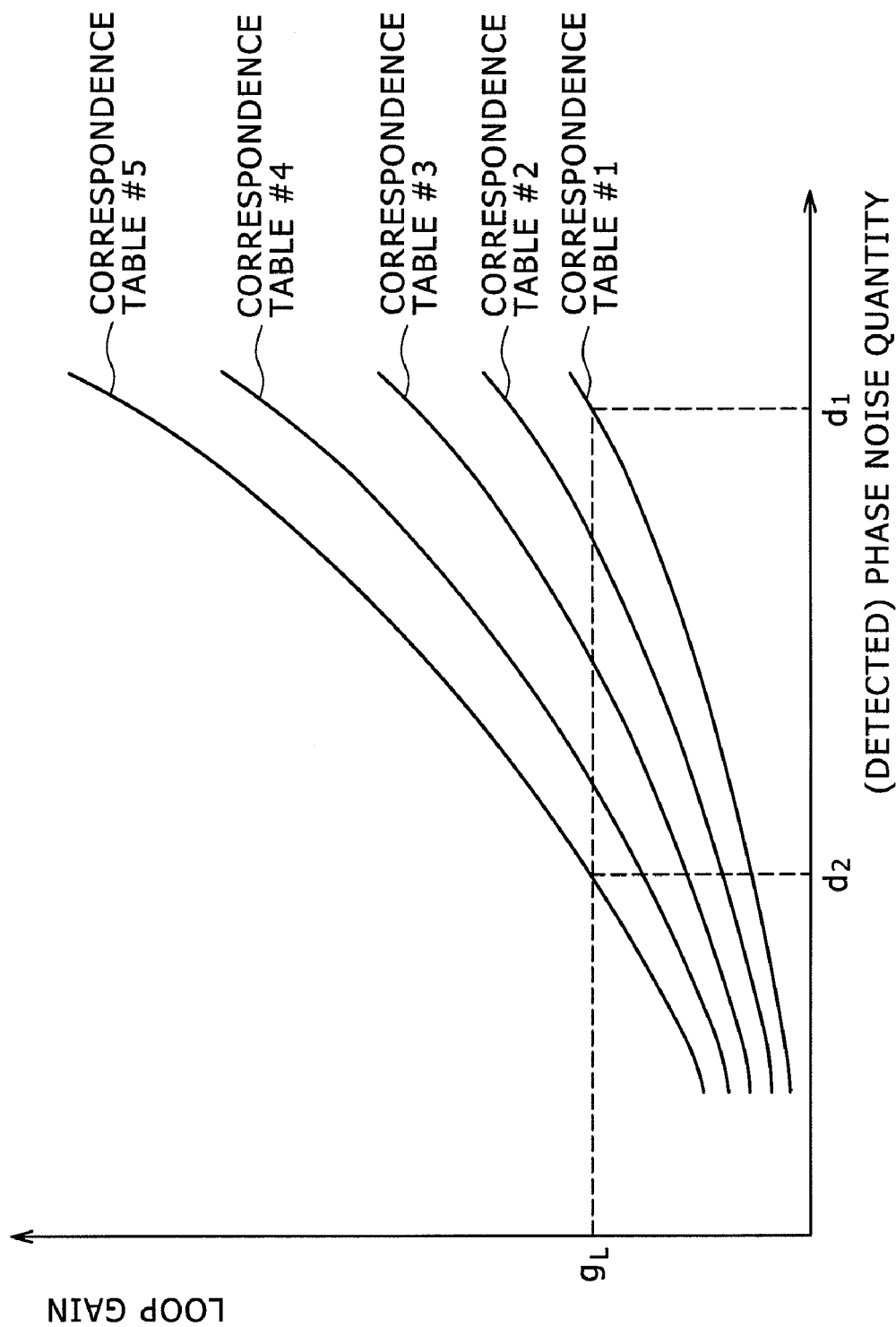
FIG. 6 is a graphic representation depicting graphically the characteristics of typical correspondence tables.

FIG. 6 is a graphic representation depicting graphically the characteristics of typical correspondence tables each applicable to and held by a different down-converter type. The horizontal axis stands for phase noise quantities and the vertical axis for loop gains, with the characteristics of the correspondence tables illustrated in curves.

A correspondence table #1 applies illustratively to the type #1 down-converter that has the phase noise quantity shown in FIG. 4. The correspondence table #1 indicates the loop gain that was found to be optimal beforehand for limiting the phase noise in the detected quantity of the type #1 down-converter (e.g., the loop gain that was found optimal for attenuating the power level at a given low frequency $f_L$ in the power spectrum).

A correspondence table #5 applies illustratively to the type #5 down-converter that has the phase noise quantity shown in FIG. 5. The correspondence table #5 indicates the loop gain that was found to be optimal beforehand for limiting the phase noise in the detected quantity of the type #5 down-converter.

In like manner, a correspondence table #2 indicates the loop gain that was found optimal beforehand for limiting the phase noise in the detected quantity of a type #2 down-converter; a correspondence table #3 indicates the loop gain that was found optimal beforehand for limiting the phase noise in the detected quantity of a type #3 down-converter; and a correspondence table #4 indicates the loop gain that was found beforehand for limiting the phase noise in the detected quantity of a type #4 down-converter.

With this embodiment, these correspondence tables are stored in the gain determination circuit 42.

If, say, the type #1 down-converter 22 is scheduled to be adopted as the down-converter 22, then the gain determination circuit 42 establishes the correspondence table #1 as the table for use in gain determination. In operation, the gain determination circuit 42 references the correspondence table #1 to determine the loop gain corresponding to the phase noise quantity signaled by the phase noise quantity detector 41, and reports the loop gain thus determined to the phase synchronizer circuit 43. In turn, the phase synchronizer circuit 43 performs phase synchronization based on the reported loop gain.

If the type #5 down-converter is scheduled to be adopted as the down-converter 22, then the gain determination circuit 42 establishes the correspondence table #5 as the table for gain determination. In operation, the gain determination circuit 42 references the correspondence table #5 to determine the loop gain corresponding to the phase noise quantity signaled by the phase noise quantity detector 41, and reports the loop gain thus determined to the phase synchronizer circuit 43. In turn, the phase synchronizer circuit 43 performs phase synchronization based on the reported loop gain.

In the examples of FIG. 4 and FIG. 5, the type #1 down-converter and the type #5 down-converter differ from one other manifesting different phase noise quantities $d_1$ and $d_2$ respectively. Still, the phase noise to be limited (i.e., power level at the frequency $f_L$ in the power spectrum) is the same for the two types, so that each of these down-converters may carry out phase synchronization based on the same loop gain $g_L$ as illustrated in FIG. 6.

As described, the phase noise limiter circuit 31 holds in advance the correspondence tables each indicating the loop gain deemed optimal for limiting the phase noise in the detected quantity of each of different converter types from which to select the down-converter 22. From the candidate correspondence tables, one that applies to the converter type to be used is selected for gain determination so that the phase noise specific to the converter in question can be limited effectively.

With the above structure adopted, even if there exist a plurality of down-converter types to be used, there is no need to design individually a different gain determination circuit having a correspondence table applicable to each of the down-converters to choose from. This feature makes it easier to design the TV set 1 than before.

When any one of the multiple down-converters prepared for selectively scheduled operation is actually put to use, the optimal limitation of the phase noise involved is accomplished. This provides the highest possible performance of phase noise limitation, which in turn enables downstream demodulation circuitry to provide the best demodulation performance (i.e., the lowest error rate).

Where a down-converter of an unknown characteristic is scheduled to be used, the correspondence tables may be switched so as to acquire the one applicable to the down-converter whose specifications are found closest to those of the down-converter in question. This makes it possible to obtain appreciably higher performance of phase noise limitation that if correspondence tables may not be changed as in ordinary setups.

A typical internal structure of the phase synchronizer circuit 43 will now be described.

The phase synchronizer circuit 43 is made up of a phase error detector 51, a loop filter 52, a numerically controlled oscillator 53, and a multiplier 54. The IF signal output by the multiplier 54 (after phase correction) passes through the loop filter 52 and numerically controlled oscillator 53 before being fed back to the IF signal output by the multiplier 54. The components ranging from the phase error detector 51 to the multiplier 54 constitute a feedback loop of this phase synchronizer circuit 53.

Using illustratively the ARCTAN function, the phase error detector 51 detects phase error in the signal output by the multiplier 54. The phase error detector 51 proceeds to output to the loop filter 52 a signal called the phase error signal corresponding to the detected phase error.

The loop filter 52 is typically an IIR (infinite impulse response) type digital filter. In operation, the loop filter 52 averages the phase error signal coming from the phase error detector 51 over a predetermined number of clock pulses and outputs the averaged signal to the numerically controlled oscillator 53.

The loop filter 52 is constituted by amplifiers 61 and 62, an adder 63, a delay element 64, and an adder 65. The amplifier 61 amplifies the phase error signal coming from the phase error detector 51 by use of the loop gain (i.e., amplified by $g_L$) reported by the gain determination circuit 42. The phase error signal thus amplified is output to the amplifier 62 and adder 65. In turn, the amplifier 62 multiplies the output of the amplifier 61 by a predetermined amplification factor ($g_F$) and forwards the result of the amplification to the adder 63. The adder 63 adds up two signals: the phase error signal amplified and output by the amplifier 62 (amplified by $g_F \cdot g_L$), and the output of the adder 63 given one clock pulse earlier by the delay element 64. The sum is output to the delay element 64 and adder 65. The delay element 64 admits the output of the adder 63, and outputs the input admitted one clock pulse earlier to the adder 63. The adder 65 adds up the output of the amplifier 61 and that of the adder 63, and sends the sum to the numerically controlled oscillator 53.

The numerically controlled oscillator 53 generates a signal whose phase represents the phase error indicated by the phase error signal output by the loop filter 52. Then the numerically controlled oscillator 53 inverts the signal (i.e., in terms of phase) and feeds the resulting signal (called the phase-corrected signal hereunder) to the multiplier 54.

The numerically controlled oscillator 53 is composed of an adder 71, a delay element 72, and an inverter 73. The adder 71 adds up the output of the adder 65 in the loop filter 52 and the output of the delay element 72, and forwards the sum to the delay element 72. The delay element 72 admits the output of the adder 71, and outputs the input given one clock pulse earlier by the adder 71 to both the adder 71 and the inverter 73. The inverter 73 inverts the output of the delay element 72 (in terms of phase) and feeds the result to the multiplier 54.

The multiplier 54 multiplies the IF signal from the RF circuit 12 by the phase-corrected signal from the numerically controlled oscillator 53. The multiplying operation produces a phase-corrected IF signal which is then output.

Figure 7:
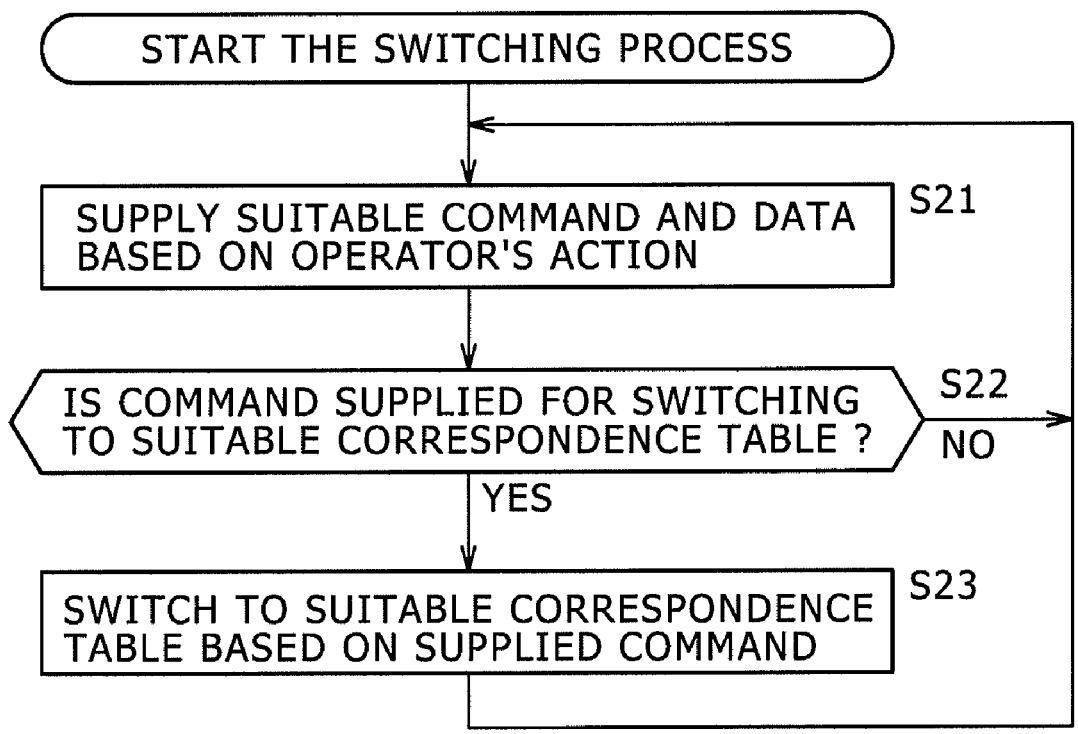
FIG. 7 is a flowchart of steps constituting a switching process performed by an operation section 14 and a control section 15 of the embodiment.

Described below in reference to the flowchart of FIG. 7 is the typical switching process carried out by the operation section 14 and control section 15.

The switching process is started when the operation section 14 is suitably operated by an operator during manufacture of the TV set 1.

In step S21, the operation section 14 supplies the control section 15 with the command and data corresponding to the action taken by the operator.

In step S22, the control section 15 checks to determine whether the command and data fed from the operation section 14 constitute a command for switching to an appropriate correspondence table to be used by the gain determination circuit 42. If in step S22 the command and data coming from the operation section 14 are not found to constitute the command for switching to an appropriate correspondence table, then control is returned to step S21. Step S21 and subsequent steps are then repeated.

If in step S22 the command and data supplied by the operation section 14 are found to constitute the command for switching to an appropriate correspondence table for use by the gain determination circuit 42, then step S23 is reached. In step S23, based on the supplied command, the control section 15 selects the appropriate correspondence table from among a plurality of correspondence tables held by the gain determination circuit 42. Control is then returned to step S21, and step S21 and subsequent steps are repeated.

As described, the stored correspondence tables are switched so that the appropriate table may be determined corresponding to the down-converter to be used according to the operator's instructions. In other words, the down-converter desired to be used may be designated by the instructions issued by the operator. Where there exist a plurality of known down-converters scheduled to be used, the inventive arrangements make it easy to accomplish optimal phase noise limitation with any one of these down-converters.

In the foregoing description, the phase noise limiter circuit was shown to be incorporated in the demodulator circuit of this embodiment. Alternatively, the phase noise limiter circuit may be arranged to be positioned outside the demodulator circuit.

The series of steps or processes described above may be executed either by hardware or by software. Where the software-based processing is to be carried out, the programs constituting the software may be either incorporated beforehand in dedicated hardware of a computer for program execution or installed upon use from a suitable program recording medium into a general-purpose personal computer or like equipment capable of executing diverse functions based on the installed programs.

Figure 8:
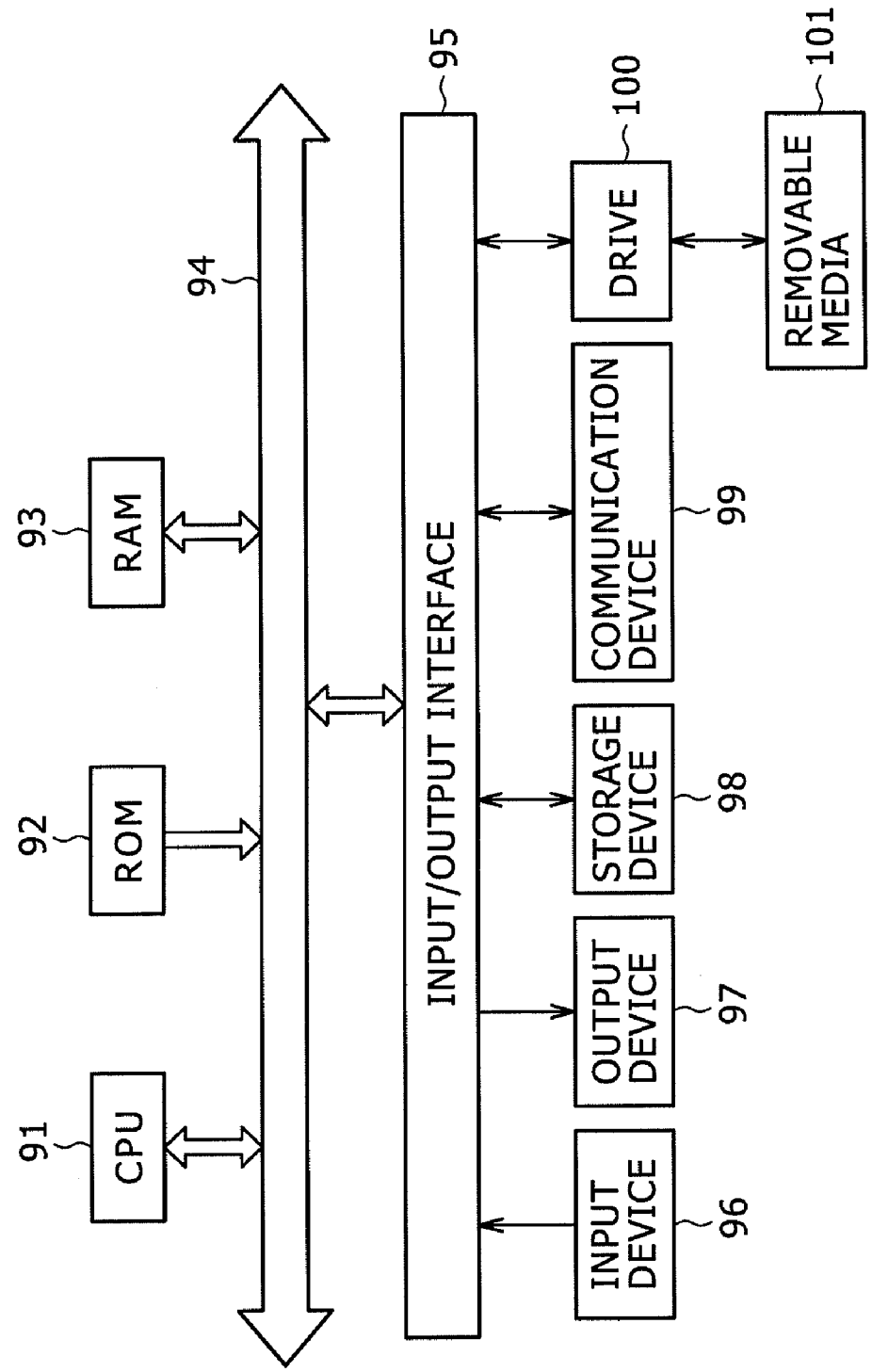
FIG. 8 is a block diagram showing a typical hardware structure of a computer embodying the embodiment of the present invention.

FIG. 8 is a block diagram showing a typical hardware structure of a computer for carrying out the above-described series of steps or processes using programs.

In the computer, a CPU 91, a ROM (read only memory) 92 and a RAM (random access memory) 93 are interconnected by way of a bus 94.

An input/output interface 95 is also connected to the bus 94. The input/output interface 95 is connected with an input device 96, an output device 97, a storage device 98, a communication device 99, and a drive 100. The input device 96 is typically made up of a keyboard, a mouse, and a microphone. The output device 97 is generally composed of a display unit and speakers. The storage device 98 is formed illustratively by a hard disk drive or a nonvolatile memory. The communication device 99 is typically constituted by a network interface. The drive 100 drives pieces of removable media 101 such as magnetic disks, optical disks, magneto-optical disks, or semiconductor memories.

In the computer of the above-outlined structure, the CPU 91 loads relevant programs illustratively from the storage device 98 into the RAM 93 by way of the input/output interface 95 and bus 94. The programs loaded in the RAM 93 are run by the CPU 91 to carry out the above-described series of steps or processes.

The programs to be executed by the computer (i.e., CPU 91) are distributed either recorded on the removable media 101 constituting package media such as magnetic disks (including flexible disks), optical disks (including CD-ROM (compact disc-read only memory) and DVD (digital versatile disc)), magneto-optical disks, or semiconductor memories; or transmitted through wired or wireless communication media such as local area networks, the Internet, and digital satellite broadcasting networks.

When a suitable piece of the removable media 101 carrying the relevant programs is attached to the drive 100, the programs are installed from the medium into the storage device 98 through the input/output interface 95. Alternatively, the programs may be received by the communication device 99 through wired or wireless transmission media before getting installed into the storage device 98. As another alternative, the programs may be preinstalled in the ROM 92 or storage device 98.

In this specification, the programs to be executed by the computer may be carried out in the depicted sequence (i.e., on a time series basis), in parallel fashion, or individually when they are invoked as desired.

It should be understood by those skilled in the art that various modifications, combinations, sub-combinations and alterations may occur depending on design requirements and other factor in so far as they are within the scope of the appended claims or the equivalents thereof.

What is claimed is:

1. A phase noise limiting apparatus comprising:
   detecting means for detecting a phase noise quantity from an input signal;
   determining means configured such that furnished with a plurality of correspondence tables indicating parameters used for phase synchronization with said input signal, said determining means determines one of said parameters in keeping with said phase noise quantity detected by said detection means on the basis of one of said plurality of correspondence tables,
   wherein the phase noise quantity detected with regard to the phase noise to be limited varies among a plurality of down-converter types,
   wherein each of the plurality of down-converter types comprises a corresponding correspondence table,
   wherein each of the plurality of correspondence tables indicates a loop gain deemed optimal for limiting the phase noise in a detected quantity of each of the plurality of down-converter types; and
   phase noise limitation means for limiting the phase noise in said input signal based on the parameter determined by said determining means.

2. The phase noise limiting apparatus according to claim 1, further comprising designation means for designating from among said plurality of correspondence tables the correspondence table to be used by said determination means.

3. The phase noise limiting apparatus according to claim 1, wherein said parameter is a loop gain of said phase noise limitation means.

4. The phase noise limiting apparatus according to claim 1, wherein said phase noise limitation means includes:
   detection means for detecting phase errors from said input signal;
   averaging means for averaging said phase errors detected by said detection means in accordance with said parameter; and
   phase compensation means for compensating the phase errors detected by said detection means from said input signal.

5. The phase noise limiting apparatus according to claim 4, wherein
   said averaging means is a loop filter; and
   said parameter is a loop gain of said loop filter.

6. A phase noise limiting method for use with a phase noise limiting apparatus for detecting a phase noise quantity from an input signal and limiting phase noise in said input signal based on the detected phase noise quantity, said phase noise limiting method comprising the steps of:
   detecting said phase noise quantity from said input signal;
   furnished with a plurality of correspondence tables indicating parameters used for phase synchronization with said input signal, determining one of said parameters in keeping with said phase noise quantity detected in said detecting step on the basis of one of said plurality of correspondence tables,
   wherein the phase noise quantity detected with regard to the phase noise to be limited varies among a plurality of down-converter types,
   wherein each of the plurality of down-converter types comprises a corresponding correspondence table,
   wherein each of the plurality of correspondence tables indicates a loop gain deemed optimal for limiting the phase noise in a detected quantity of each of the plurality of down-converter types; and
   limiting the phase noise in said input signal based on the parameter determined in said determining step.

7. A non-transitory computer readable medium storine a program for causing a computer to execute a phase noise limiting process of a phase noise limiting apparatus for detecting a phase noise quantity from an input signal and limiting phase noise in said input signal based on the detected phase noise quantity, said program comprising the steps of:
   detecting said phase noise quantity from said input signal;
   furnished with a plurality of correspondence tables indicating parameters used for phase synchronization with said input signal, determining one of said parameters in keeping with said phase noise quantity detected in said detecting step on the basis of one of said plurality of correspondence tables,
   wherein the phase noise quantity detected with regard to the phase noise to be limited varies among a plurality of down-converter types,
   wherein each of the plurality of down-converter types comprises a corresponding correspondence table,
   wherein each of the plurality of correspondence tables indicates a loop gain deemed optimal for limiting the phase noise in a detected quantity each of the plurality of down-converter types; and
   limiting the phase noise in said input signal based on the parameter determined in said determining step.

8. A receiving apparatus for receiving an input signal, said receiving apparatus comprising:
   frequency conversion means for converting said input signal in frequency;
   detection means for detecting a phase noise quantity from said input signal converted in frequency by said frequency conversion means;
   determination means configured such that furnished with a plurality of correspondence tables indicating parameters used for phase synchronization with said input signal, said determination means for determining one of said parameters in keeping with said phase noise quantity detected by said detection means on the basis of one of said plurality of correspondence tables which corresponds to the type of a frequency converter constituting said frequency conversion means,
   wherein the phase noise quantity detected with regard to the phase noise to be limited varies among a plurality of down-converter types,
   wherein each of the plurality of down-converter types comprises a corresponding correspondence table,
   wherein each of the plurality of correspondence tables indicates a loop gain deemed optimal for limiting the phase noise in a detected quantity of each of the plurality of down-converter types; and
   phase noise limitation means for limiting the phase noise in said input signal based on the parameter determined by said determination means.

9. The receiving apparatus according to claim 8, wherein said input signal is a radio frequency signal known as the radio frequency signal; and said frequency conversion means is a radio frequency circuit known as the radio frequency circuit for converting said radio frequency signal into an intermediate frequency signal known as the intermediate frequency signal.

10. A receiving method for receiving an input signal, said receiving method comprising the steps of:
converting said input signal in frequency by use of frequency conversion means;
detecting a phase noise quantity from said input signal converted in frequency by said frequency conversion means in said converting step;
furnished with a plurality of correspondence tables indicating parameters used for phase synchronization with said input signal, determining one of said parameters in keeping with said phase noise quantity detected in said detecting step on the basis of one of said plurality of correspondence tables which corresponds to the type of a frequency converter constituting said frequency conversion means,
wherein the phase noise quantity detected with retard to the phase noise to be limited varies among a plurality of down-converter types,
wherein each or the plurality of down-converter types comprises a corresponding correspodencee table,
wherein each of the plurality of correspondence tables indicates a loop gain deemed optimal for limiting the phase noise in a detected quantity of each of the plurality of down-converter types; and
limiting the phase noise in said input signal based on the parameter determined in said determining step.

11. A non-transitory computer readable medium storing a program for causing a computer to execute a receiving process for receiving an input signal, said program comprising the steps of:
converting said input signal in frequency by use of frequency conversion means;
detecting a phase noise quantity from said input signal converted in frequency by said frequency conversion means in said converting step;
furnished with a plurality of correspondence tables indicating parameters used for phase synchronization with said input signal, determining one of said parameters in keeping with said phase noise quantity detected in said detecting step on the basis of one of said plurality of correspondence tables which corresponds to the type of a frequency converter constituting said frequency conversion means,
wherein the phase noise quantity detected with regard to the phase noise to be limited varies among a plurality of down-converter types,
wherein each of the plurality of down-converter types comprises a corresponding correspondence table,
Wherein each of the plurality of correspondence tables indicates a loop gain deemed optimal for limiting the phase noise in a detected quantity of each of the plurality of down-converter types; and
limiting the phase noise in said input signal based on the parameter determined in said determining step.

12. A phase noise limiting apparatus comprising:
a detection section configured to detect a phase noise quantity from an input signal;
a determination section configured such that furnished with a plurality of correspondence tables indicating parameters used for phase synchronization with said input signal, said determination section determines one of said parameters in keeping with said phase noise quantity detected by said detection section on the basis of one of said plurality of correspondence tables,
wherein the phase noise quantity detected with regard to the phase noise to be limited varies among a plurality of down-converter types,
wherein each of the plurality of down-converter types comprises a corresponding correspondence table,
wherein each of the plurality of correspondence tables indicates a loop gain deemed optimal for limiting the phase noise in a detected of each of the plurality of down-converter types; and
a phase noise limitation section configured to limit the phase noise in said input signal based on the parameter determined by said determination section.

13. A receiving apparatus for receiving an input signal, said receiving apparatus comprising:
a frequency conversion section configured to convert said input signal in frequency;
a detection section configured to detect a phase noise quantity from said input signal converted in frequency by said frequency conversion section;
a determination section configured such that furnished with a plurality of correspondence tables indicating parameters used for phase synchronization with said input signal, said determination section determines one of said parameters in keeping with said phase noise quantity detected by said detection section on the basis of one of said plurality of correspondence tables which corresponds to the type of a frequency converter constituting said frequency conversion section,
wherein the phase noise quantity detected with regard to the phase noise to be limited varies among a plurality of down-converter types,
wherein each of the plurality of down-converter types comprises a corresponding correspondence table,
wherein each of the plurality of correspondence tables indicates a loop gain deemed optimal for limiting the phase noise in a detected quantity of each of the plurality of down-converter types; and
a phase noise limitation section configured to limit the phase noise in said input signal based on the parameter determined by said determination section.

* * * * *